US009913436B2

(12) United States Patent
Miller et al.

(10) Patent No.: US 9,913,436 B2

(45) Date of Patent: Mar. 13, 2018

(54) STUMP GRINDER WHEEL CONFINEMENT SYSTEM AND METHOD THEREFOR

(71) Applicant: Bandit Industries Inc., Remus, MI (US)

(72) Inventors: Michael Thomas Miller, Mt. Pleasant, MI (US); Michael B. Morey, Shepherd, MI (US)

(73) Assignee: BANDIT INDUSTRIES, INC., Remus, MI (US)

( * ) Notice: Subject to any disclaimer, the term of this patent is extended or adjusted under 35 U.S.C. 154(b) by 996 days.

(21) Appl. No.: 14/259,082

(22) Filed: Apr. 22, 2014

(65) Prior Publication Data

US 2014/0311628 A1 Oct. 23, 2014

Related U.S. Application Data

(60) Provisional application No. 61/814,502, filed on Apr. 22, 2013.

(51) Int. Cl.
*A01G 23/06* (2006.01)

(52) U.S. Cl.
CPC ....... *A01G 23/067* (2013.01); *Y10T 29/49826* (2015.01)

(58) Field of Classification Search
CPC .............................. A01G 23/06; A01G 23/067
See application file for complete search history.

(56) References Cited

U.S. PATENT DOCUMENTS

| | | | | |
|---|---|---|---|---|
| 7,011,124 | B1 | 3/2006 | Morey | |
| 8,109,303 | B1 | 2/2012 | Holmes | |
| 8,584,718 | B2 | 11/2013 | Holmes | |
| 9,462,759 | B2 * | 10/2016 | Knipp .................... | A01G 23/06 |

* cited by examiner

*Primary Examiner* — Matthew G Katcoff
(74) *Attorney, Agent, or Firm* — Howard & Howard Attorneys PLLC

(57) ABSTRACT

A stump grinder for a powered cutting wheel attached to a boom is disclosed, wherein the improvement relates to a cutting wheel confinement system which includes a cutting wheel further comprising a coaxially disposed spindle extending from an unsupported side, and a boom which further comprises an opening which is centrally disposed with the spindle and sized so as to allow the spindle to freely rotate therein without contact when the cutting wheel is not rotating, and to allow for a predetermined amount of eccentric motion of the spindle before the spindle makes contact with the first opening, and which prevents more than a predetermined amount of eccentric motion of the spindle by confining the eccentric motion of the spindle via contact with the first opening.

19 Claims, 11 Drawing Sheets

59
100B
88
100A

STUMP GRINDER WHEEL CONFINEMENT SYSTEM AND METHOD THEREFOR

BACKGROUND OF THE INVENTION

The present invention relates to cutting and grinding systems, and more specifically to wheel confinement and guide devices and systems, and methods thereof for a stump grinding system.

A variety of machines have been developed to reduce or otherwise remove undesirable plant roots and stumps. Included therein are machines that chip, cut, grind, or otherwise remove and reduce wood (e.g., tree and plant) stumps and roots including, generally, stump grinders comprising a powered cutting and grinding wheel.

Generally speaking such stump grinders comprise: a power source, typically comprising an internal combustion engine for providing the necessary power; a rotatable cutting and grinding assembly including a cutting and grinding wheel which typically comprises a wheel or disc having replaceable teeth mounted thereon for chipping and grinding the stump; a drive system for conveying the power from the power source to the cutting assembly, wherein known drive systems comprise a belt and pulley system; clutch; hydraulic motors and other hydrostatic powered systems; Power Take Off (PTO) systems, and like devices and systems; and a frame including a boom, fork or arm pivotally secured thereto for operatively supporting and rotatably mounting the cutting wheel so as to allow the power source to drive the cutting wheel.

Additionally, while such cutting assemblies may comprise replaceable teeth mounted to the cutting wheel, such cutting assemblies may also comprise a plurality of holders which are adapted to be removably attached to the cutting wheel, along with one or more cutting teeth which are adapted to be removably attached to the holder for replacement thereof when needed (e.g., when worn or damaged).

With respect to the holder and tooth/teeth combination (i.e., the tooth assembly), the holders may be affixed to a single side of the cutting wheel, and/or both sides of the cutting wheel, either individually or via a paired relationship so as to be mateably affixed thereto. Yet further, the configuration of the tooth assemblies on the cutting wheel may comprise various patterns to better effectuate the grinding process. And even further still, the holders themselves may comprise a single design, multiple designs, mirrored designs, and combination thereof, all such design choices being generally used to: increase performance; reduce maintenance; and increase operability, as well as control of the costs and expenses related thereto and in order to better effectuate the grinding process.

Yet further, many such stump grinders include an actuating assembly and system which move the stump grinder and/or cutting assembly (e.g., relative to the stump), as well as control systems which are operatively connected to the actuating assemblies and systems for control of, for example, the direction and rate of movement and travel of the actuating assembly and/or cutting assembly and in order to assist with the stump grinding process. Such actuating assemblies are typically hydraulic in nature, but may also be pneumatic, electronic, mechanical, and any combination thereof.

During removal of a tree stump from a landscape, and via the control system (if so equipped), an operator directs the cutting assembly, via the actuating assembly, to in order to engage a portion of the stump. As the cutting assembly engages the stump, the operator will typically laterally advance or feed the rotatable cutting wheel across an upper surface of the stump, thereby grinding away the upper portion of the stump. However, this could also be done vertically, diagonally, or fore and aft. Then, upon completion of a lateral pass across the stump, the operator will adjust the cutting assembly to engage a new surface/portion of the stump and once again direct the rotatable cutting wheel across the upper surface in a lateral motion. This process is then repeated until the stump is ground to an acceptable depth, that depth typically being below the grade of the landscape (i.e., subsurface).

Examples of such stump grinding machines are disclosed in: U.S. Pat. No. 7,011,124 entitled "Stump grinder having automatic reversing feed assembly", issued Mar. 14, 2006; U.S. Pat. No. 8,109,303 entitled "Stump grinder having an automatic depth control system", issued Feb. 7, 2012; and U.S. Pat. No. 8,584,718, entitled "Stump grinder having an automatic depth control system", issued on Nov. 19, 2013 and which is a divisional application of U.S. Pat. No. 8,109,303, each of which is incorporated herein by reference in their entirety.

Efficient and appropriate grinding relies on proper operation and control of the stump grinder and its various systems. The operator must continually maintain and adjust numerous settings including power, wheel speed, feed rate, lateral movement, and the like, all in an effort to efficiently use the machine, without undue wear and tear, and in order to effectuate the efficient removal of stumps. However, and regardless of operator experience, the act of the grinding wheel contacting and grinding the stump subjects the stump grinder to numerous adverse stresses, forces, and the like. Further, the grinding process subjects the grinder and grinding wheel to numerous adverse effects as a result of the material reduction process including, but not limited to, contact with foreign objects (e.g., non-plant and non-wood) such as dirt, rocks, and other foreign material.

As such, the cutting wheel, including the various holders and teeth, are subjected to the numerous and varied adverse effects which result from and are otherwise generated via such grinding operations. Generally speaking, these forces include the force exerted on each of the cutting teeth during grinding (generally perpendicular to the cutting edge of the tooth); as well as the forces exerted on the teeth and wheel (generally tangential to the wheel/teeth when considering the downward grinding; and lateral when considering the lateral movement thereof). Further, the angle of attack (e.g., angle of the holder and/or teeth) of the cutting assembly will also affect not only the ability, rate, and ease at which the stump grinding operation can be carried out, but also the forces exerted on the cutting assembly. Thus, the wheel, holder, and teeth must all be properly positioned relative to one another, as well as relative to the support arm.

As described herein-above, such cutting wheels may be operatively connected and driven via a belt and pulley system wherein it is typical to have the grinding wheel operatively mounted to the support arm or boom, which typically comprises a forked arm, via a pair of bearings on each side of the cutting wheel, wherein power is delivered to the cutting wheel via the belt and pulley system.

Alternatively, it is also known to operatively connect and drive the cutting wheel via a direct drive mechanism such as, for example, a hydraulic drive which may be operatively connected to a single side of the grinding wheel. Such systems are commonly known as direct-drive systems. Further, and at least partially due to the manner of operative connection of these direct drive systems to the cutting wheel, such direct drive systems, generally speaking, do not require bearings on both sides of the cutting wheel as do the belt/pulley driven systems and in one exemplary system, the cutting wheel is operatively mounted to and rotatably suspended on the arm or boom via the direct (drive) connection, as well as powered thereby. Further, in such direct drive systems, the side of the cutting wheel opposite the drive may be free of any connection and support, including bearings and the like, and thus the wheel in such systems is operatively connected to the boom via a single operative connection to the drive. As such, for example, a single sided boom or single arm may be utilized as opposed to a forked design, or if a forked arm or boom is utilized, the unused side may be configured as desired and without the need to have the arm or boom required (e.g., designed) for support of the (now) free side of the wheel, thereby reducing a design constraint of such machines and allowing for other designs to be utilized.

With respect to these single sided, direct drive systems, and while they produce many advantages over other system, including cost and maintenance reduction, the lack of support on the unsupported, open, or free side, in conjunction with the high stress and forces generated during the grinding process, may lead to undesired effects which are associated with such singly supported-driven systems. For example only, such undesired effects may include: torsional; lateral; horizontal and vertical; angular; as well as fore and aft affects, forces, stresses and the like.

While the mitigation and prevention of such effects have been attempted through the inclusion of a bearing on the open or opposite side of the direct drive, complications arise with such solutions. For example, and as a consequence of a direct drive system operatively supporting and powering the wheel, when the bearing of a such a system fails the operator may not be aware of such a problem, as the direct drive system can operate without such support. This can be problematic in such situations, as for example, if the bearing is operated with such a failure (e.g., remain in operation during and after failure), the bearing will likely "burn out" and fail thereby causing additional problems and damage to the machine, boom, drive, axel, wheel, and teeth. Consequently, the costs of operating and maintenance of such machines are increased, as well as the attention which is required, as to its operation and including by the operator.

Therefore, there is a need in the art to provide devices and systems and methods for a stump grinder which: mitigate, reduce, and prevent the undesired effects associated with such drive systems including, for example, increasing the expenses associated with the manufacture, assembly, and operation thereof; while giving, retaining and increasing the desired effects such as, for example, the ability, rate, and ease of the stump grinding operation, and also reducing, mitigating, and preventing the costs and time of the use, maintenance, and repair associated with these machines.

Accordingly, a need exists for novel systems and methods which have, among other advantages, the ability to provide a cutting assembly which optimizes the cutting operation; is durable so as to be able to handle the various stresses associated with operation thereof and, inter alia, reduces breakage, increases longevity, as well as is serviceable for replacement and repair; while also being cost effective. It is further desirable to provide such devices and systems which are effective; relatively inexpensive to manufacture, provide, assemble, and operate; and which are retrofittable to existing stump grinders.

Therefore, stump grinding systems, devices and methods which solve the aforementioned disadvantages and having the aforementioned advantages are desired.

SUMMARY OF THE PRESENT INVENTION

The aforementioned drawbacks and disadvantages of these former cutting and grinding systems, have been identified and a solution is set forth herein by the inventive stump grinding system which includes an axel, hub or spindle which is adapted or otherwise configured to be coaxially (e.g., centrally) disposed on a side of a cutting wheel, and an aperture disposed coaxially therewith to allow for rotation therein so as to allow the spindle to freely rotate therein when under the cutting wheel is not rotating, or when rotating but not grinding (e.g., a no-load condition).

Another aspect of the present invention includes, in a stump grinder which includes a powered cutting wheel attached to a boom, wherein the improvement relates to a cutting wheel confinement system wherein the cutting wheel further comprises a driven side and an unsupported side, and the cutting wheel further comprises a coaxially disposed spindle which extends from the unsupported side. Further, the boom comprises a driven side and an unsupported side, wherein the boom unsupported side further includes a first opening which is centrally disposed with and in relation to the spindle, as well as sized so as to allow the spindle to freely rotate therein (e.g., without contact) when the cutting wheel is not rotating, and/or when rotating but not grinding or otherwise being exposed to lateral (e.g., grinding) forces, as well as allows for a predetermined amount of eccentric (e.g., non-coaxial, lateral, transverse) movement of the spindle with respect to the opening, as set by the clearance or gap between the outside of the spindle and the inside of the opening, before the spindle makes contact with the first opening, thereby preventing more than a predetermined amount of eccentric motion of the spindle by confining the eccentric motion of the spindle via contact with the first opening.

Such a confinement system may also include: a first opening which is replaceable without having to remove the boom from the stump grinder; a first opening which is replaceable without having to remove the cutting wheel from the stump grinder; and a first opening which is disposed on a bracket attached to the boom. Further embodiments may also include a bracket which further comprises a first and second bracket, wherein the first bracket includes a first U-shaped channel which is adjacently disposed to a second bracket which includes a second U-shaped opening, and wherein the first and second brackets combine to form an enclosed aperture which is disposed coaxially with the spindle.

In another aspect of the present invention, a stump grinder cutting wheel confinement system for a stump grinder is disclosed, wherein the improvement relates to a cutting wheel confinement system which comprises a hub which is adapted to be coaxially attached to a side (e.g., single side) of a stump grinder cutting wheel and which includes a spindle which extends from a base of the hub. The stump grinder also includes a guide comprising a first aperture, wherein the guide is adapted to be attached to a boom of a stump grinder such that the aperture is disposed coaxially with the stump grinder cutting wheel (e.g., the spindle) and which is configured (e.g., sized) so as to allow the spindle to rotate therein without contact when the hub is attached to a stump grinder cutting wheel. However, upon a certain and predetermined amount of eccentric movement of the spindle, contact will be initiated and thereby limit the amount of such eccentric movement.

Such a confinement system may also include: a hub which is adapted to be centrally (as opposed to coaxially) attached to a side of a stump grinder cutting wheel; a base which further comprises at least one (third) aperture for allowing at least one fastener (e.g., threaded fastener) to attach the hub to a side of a stump grinder cutting wheel; a base which further comprises at least one (fourth) aperture for accommodating at least one protrusion (e.g., bolt head) extending from a stump grinder cutting wheel side and to allow the base to be attached flush (e.g., flat with and otherwise in full contact) with a side of a stump grinder cutting wheel. Additionally, the first aperture may comprise a U-shaped channel. Further exemplary embodiments may include: a guide which further comprises a first and a second guide, wherein the second guide comprises a second aperture and is adapted to be attached to a boom of a stump grinder such that the second aperture is disposed coaxially with and cutting wheel, wherein further the second aperture is configured to allow the spindle to rotate therein without contact when the hub is attached to a stump grinder cutting wheel. Yet further exemplary embodiments may comprise: a second aperture which is U-shaped; a second guide which is adapted to be disposed adjacent the first guide; a bracket which is adapted to be attached to a boom of a stump grinder and which is further adapted to be attached to the guide, whereby the bracket is adapted to be attached to the guide with the boom disposed therebetween; and a bracket which is adapted to be attached to a boom of a stump grinder which is even further adapted to be attached to at least one of the first guide and the second guide.

And still in another aspect of the present invention, a stump grinder having a powered cutting system and which includes a cutting wheel attached to a boom is disclosed, wherein the improvement relates to a cutting wheel guide system which comprises: a hub coaxially disposed on a side of the stump grinder cutting wheel which includes a spindle; and a guide which comprises a first aperture and which is disposed on the boom in such a manner that the first aperture is disposed coaxially with the spindle and sized so as to allow the spindle to be disposed therein without contact when the cutting wheel is not rotating.

Such a guide system may also include: a first aperture which is sized to allow a specified amount of eccentric motion, as defined by the clearance, before the spindle contacts the aperture; a first aperture which may comprise a U-shaped channel; a guide which may further comprise a first and a second guide, wherein the second guide comprises a second aperture which is disposed on the boom coaxially with the spindle and the first aperture and sized so as to allow the spindle to be disposed therein without contact when the cutting wheel is not rotating and a second aperture which comprises a U-shape. Further, the second guide may also be disposed adjacent the first guide. Yet further, the first and the second coaxially disposed apertures may form a circular hole having an inside diameter that is larger than an outside diameter of the spindle, the hole being centrally disposed with the spindle, so as to allow the spindle to freely rotate therein when the cutting wheel is not actively grinding.

Yet another aspect of the present invention includes a method of confining a stump grinder cutting wheel to a predetermined amount of eccentric movement wherein the method comprises the steps of: providing a stump cutter having a powered cutting wheel attached to a boom, the cutting wheel being supported on a single side; providing a cutting wheel with a spindle on an unsupported side; providing an aperture on the stump grinder which is coaxially disposed with the spindle and comprises an inside diameter which is larger than an outside diameter of the spindle; allowing the spindle to rotate without contact within the aperture when the cutting wheel is not grinding; and preventing the spindle from eccentric movement with respect to the aperture via contact between the outside diameter of the spindle and the inside diameter of the aperture.

Other objects, advantages, and features of the invention will become apparent upon consideration of the following detailed description and drawings. As such, the above brief descriptions set forth, rather broadly, the more important features of the present novel invention so that the detailed descriptions that follow may be better understood and so that the contributions to the art may be better appreciated. There are of course additional features that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. To wit, the stump grinder of the present disclosure is capable of other embodiments and of being practiced and carried out in various ways. Also, it is to be understood that the phraseology and terminology employed herein are for description and not limitation. Where specific dimensional and material specifications have been included or omitted from the specification or the claims, or both, it is to be understood that the same are not to be incorporated into the claims, unless so claimed.

As such, those skilled in the art will appreciate that the conception upon which this disclosure is based may readily be used as a basis for designing other structures, methods, and systems for carrying out the several purposes of the present invention. It is important therefore that the claims are regarded as including such equivalent constructions, as far as they do not depart from the spirit and scope of the present invention.

Further, the purpose of the Abstract is to enable the United States Patent and Trademark Office, the public generally, and especially the scientists, engineers, and practitioners in the art who are not familiar with the patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any manner.

These and other objects, along with the various features and structures that characterize the invention, are pointed out with particularity in the claims annexed to and forming a part of this disclosure. For a better understanding of the stump grinder of the present disclosure, its advantages, and the specific traits attained by its use, reference should be made to the accompanying drawings and other descriptive matter in which there are illustrated and described the preferred embodiments of the invention.

As such, while embodiments of the stump grinder are herein illustrated and described, it is to be appreciated that various changes, rearrangements, and modifications may be made therein without departing from the scope of the invention as defined by the claims.

BRIEF DESCRIPTION OF THE DRAWINGS

As a compliment to the description and for better understanding of the specification presented herein, 11 pages of drawings are disclosed with an informative, but not limiting, intention.

DETAILED DESCRIPTION OF THE PREFERRED EMBODIMENT

Figure 1A:
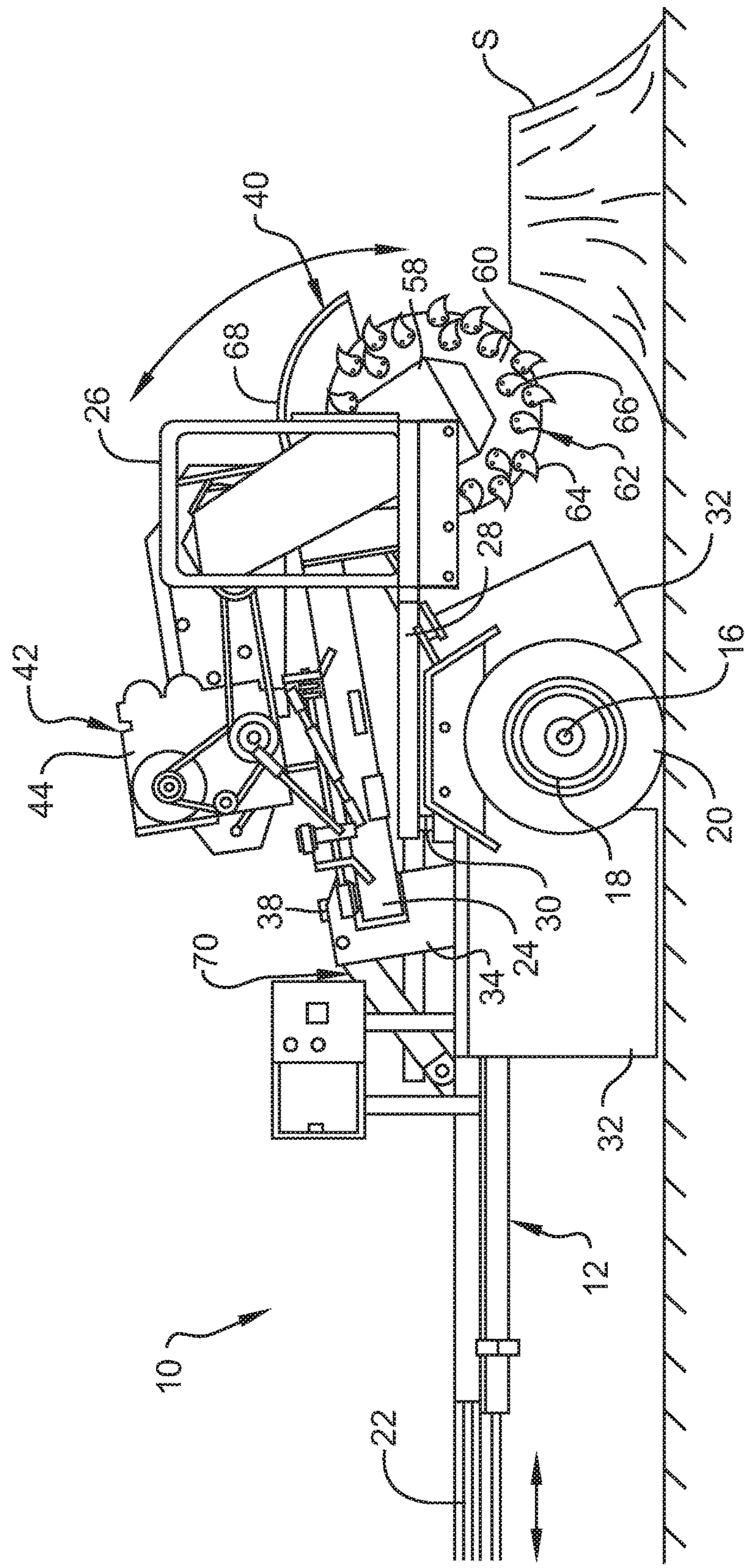
FIG. 1A is a left side view of a pulley/belt driven prior art stump grinder.

The best mode for carrying out the invention is presented in terms of the preferred embodiment, wherein similar referenced characters designate corresponding features throughout the several figures of the drawings.

For purposes of description herein, the terms "upper", "lower", "right", "left", "rear", "front", "vertical", "horizontal", and derivatives thereof, shall relate to the invention as oriented in FIG. 1. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiments of the invention, examples of which are illustrated in the accompanying drawings. These same referenced numerals may be used throughout the drawings to refer to the same or like parts. Further, like features between the various embodiments may utilize similar numerical designations. Where appropriate, the various similar features may have been further differentiated by an alphanumeric designation, wherein the corresponding alphabetic designator has been changed. Further, the dimensions illustrated in the drawings (if provided) are included for purposes of example only and are not intended to limit the scope of the present invention. Additionally, particular details in the drawings which are illustrated in hidden or dashed lines (if provided) are to be considered as forming no part of the present invention.

Generally, while stump grinders are commonly known and regularly utilized to remove or reduce undesired tree roots and stumps, there is a need to increase the reliability, efficiency, and reduce maintenance costs.

Therefore, there is a need in the art to provide systems, devices, and methods for a stump grinding system, which have, among other advantages, the ability to provide a cutting assembly which optimizes the cutting operation; is durable so as to be able to handle the various stresses associated with operation thereof and, inter alia, reduces breakage, increases longevity, as well as is serviceable for replacement and repair; while also being cost effective. It is further desirable to provide such devices and systems which are relatively inexpensive to manufacture, assemble, easily operable, as well as effective.

Accordingly, stump grinding systems, devices and methods which solve the aforementioned disadvantages and having the aforementioned advantages are desired.

In a broader sense, and referring now to the drawings and in particular FIG. 1, a prior art stump grinder 10 is illustrated. The stump grinder 10 includes a frame, generally indicated at 12 which extends generally longitudinally. The stump grinder 10 may also include a hitch assembly 14 at one longitudinal end of the frame 12 to receive a hitch of a vehicle (not shown) for towing therebehind. The stump grinder 10 also includes one or more axles 16 rotatably supported by the frame 12, wheel/rims 18 operatively connected to the axle 16, and tires 20 attached to the wheel rims 18 to facilitate movement of the stump grinder during transportation and movement relative to a stump (S).

The frame 12 includes a first or lower section 22 and a second or upper section 24 operatively supported by the lower section 22. The lower section 22 may include an operational viewing window 26 and an arm 28 pivotally mounted relative to the frame 12 about a pivot point 30. The operational viewing window 26 is connected to the arm 28 and provides an operator (not shown) of the stump grinder 10 with shielded viewing access during operation. It should be appreciated that the arm 28 may be jointed to further position the operational viewing window 26 or may include a telescoping feature to further extend the operational viewing window 26 relative to the frame 12.

The lower section 22 further includes a flexible curtain 32 that depends, hangs from, and is otherwise supported by the frame 12 to shield the legs of an operator (not shown) from comminuted stump material that may be thrown during operation. The curtain 32 may extend around the rear and sides of the frame 12 or may (exclusively or otherwise) extend below the operational viewing window 26.

The upper section 24 of the frame 12 is disposed over the lower section 22 and movable relative to the lower section 22. The frame 12 may also include a connector member 34 pivotally attaching the upper section 24 to the lower section 22, wherein the connector member 34 may comprise a first pivot pin 36 disposed along a horizontal axis which permits the upper section 24 to move in a vertical manner relative to the lower section 22. The connector member 34 may further include a second pivot pin 38 disposed along a vertical axis, wherein the second pivot pin 38 permits the upper section 24 to move in a lateral manner relative to the lower section 22. It should be appreciated that the pivoting feature of the frame 12 enables movement of the stump grinder 10 relative to the stump (S) for efficient operation.

Both the upper and lower sections 22, 24 are generally constructed of metal such as steel and are generally rectangular in cross-section. It should be appreciated that the upper and lower sections 22, 24 of the frame 12 may be constructed from any material suitable for use in connection with stump grinding and may have any suitable cross-sectional shape. It should also be appreciated that, while the frame 12 is shown in a bisected manner, the frame 12 may be of a unitary construction and the pivoting feature maintained through pivotal movement of a cutting assembly, generally indicated at 40 and to be described, relative to the frame 12.

The stump grinder 10 further includes a drive assembly, generally indicated at 42. The drive assembly 42 is mounted to the frame 12 and adapted to drive the cutting assembly 40. The drive assembly 42 includes an engine 44 operatively coupled to the cutting assembly 40 by a drive mechanism 43. It should be appreciated that the drive mechanism 43 may include any known drive including, for example only, a belt/pulley system, a drive shaft, a PTO (Power Take Off), a chain, a clutch, or a hydraulic drive, each adapted to drive the cutting assembly 40. In this prior art example, the drive mechanism 43 includes a pulley/belt drive system disposed between and interconnecting the engine 44 and cutting assembly 40 via belts disposed over and interconnecting pulleys.

Figure 1B:
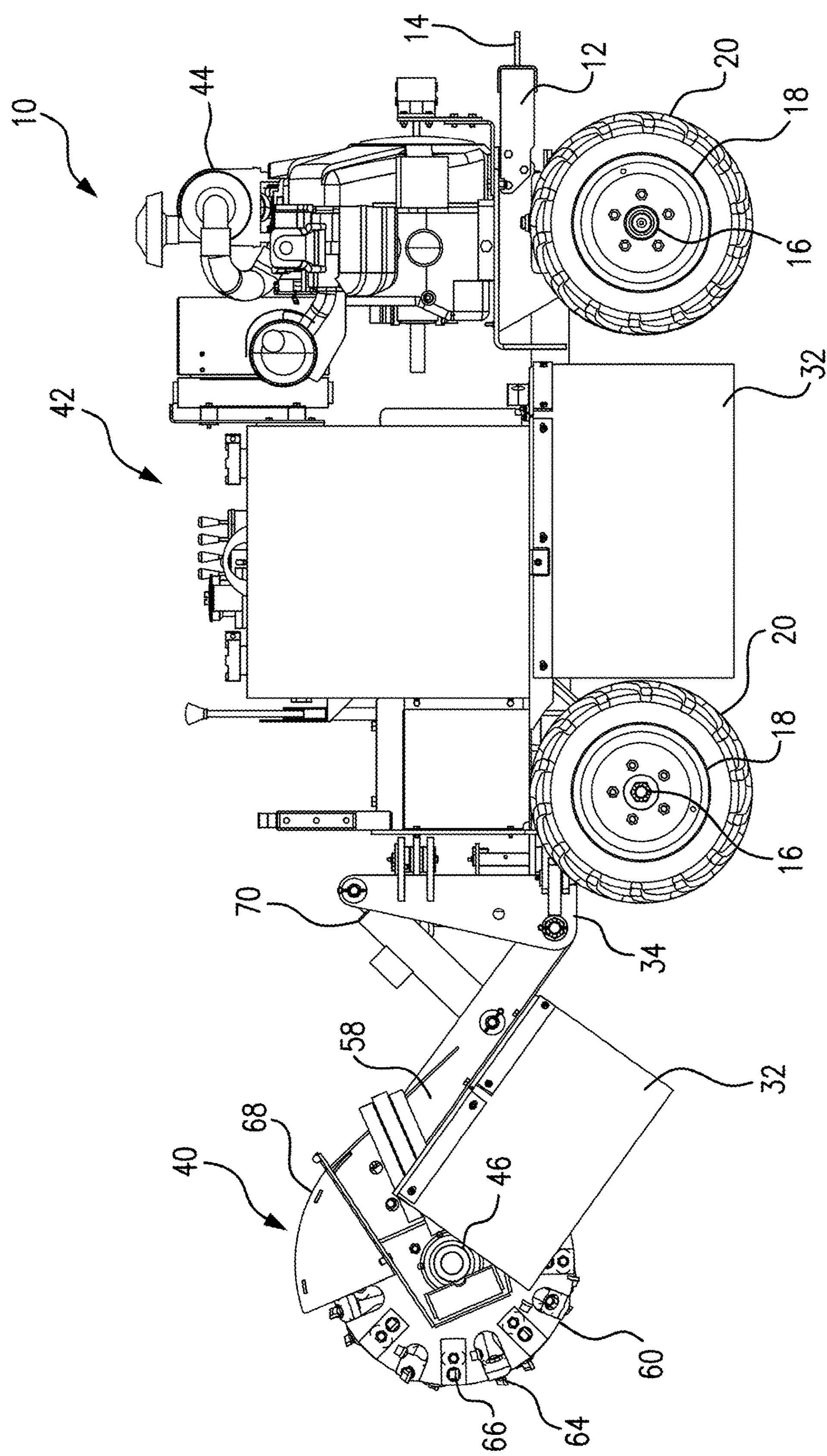
FIG. 1B is a right side view of a prior art stump grinder, the boom illustrated in an upward position and the cutting wheel drive system removed for clarity.
Figure 2:
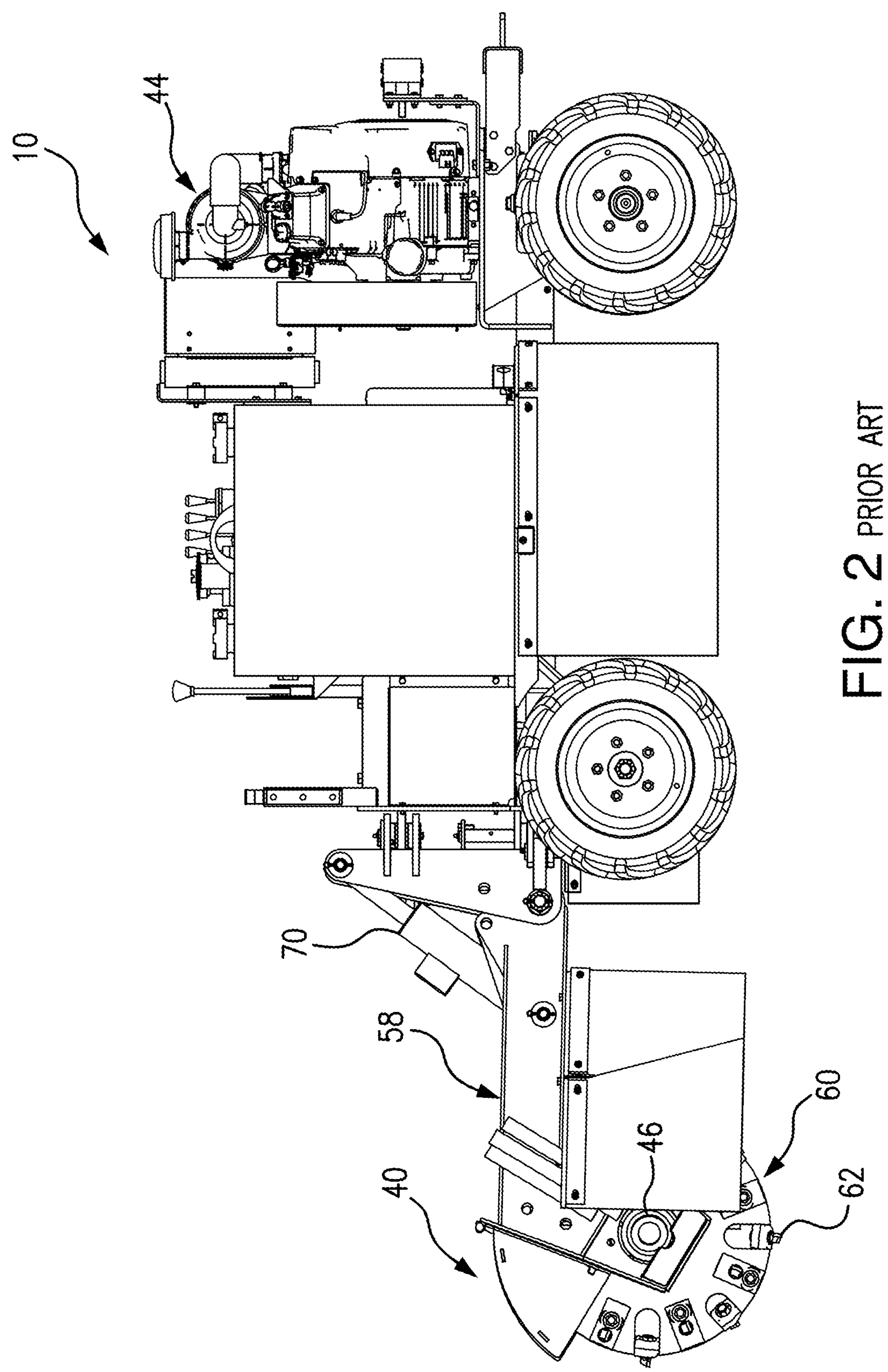
FIG. 2 is the stump grinder of FIG. 1B, the boom illustrated in a downward position.

FIG. 1B illustrates another prior art embodiment wherein a direct drive, for example a hydraulic drive (not illustrated) is directly connected to and operates the cutting wheel 60. It should be appreciated that the engine 44 may be an internal combustion engine or may operate through some other manner. It should also be appreciated that while the engine 44 is shown operatively mounted to the frame 12, the engine 44 may also be remotely located relative to the stump grinder 10 and operatively connected to the cutting assembly 40 by a drive assembly 42 such as in a power take-off (PTO) system (not shown).

The stump grinder 10 further includes a cutting assembly 40 operatively coupled to the drive assembly 42. The cutting assembly 40 includes a boom 58 operatively supported by the frame 12 at one end and a cutting wheel 60 rotatably connected at the other end of the boom 58. The cutting wheel 60 rotates relative to the boom 58 and includes a plurality of cutting teeth, generally indicated at 62, adapted to engage the stump (S). It should be appreciated that the cutting wheel 60 may be operatively coupled to the engine 44 by the drive mechanism (not shown).

As illustrated, the cutting teeth 62 may include a primary set 64 having a primary function of engaging the stump (S) and a secondary set 66 adjacent the primary set 64 for removing the comminuted material away from the primary set 64. The cutting assembly 40 further includes a guard 68 disposed adjacent and connected to the boom 58 to cover a top section of the cutting wheel 60. The guard 68 prevents comminuted material from being ejected in an upward manner. It should be appreciated that the cutting wheel 60 may include a plurality of a holders, knives, hooks, and bars (not shown) to convert the stump (S) into comminuted material.

Referring now to FIGS. 1A-1B, the stump grinder 10 includes an actuating assembly generally indicated at 70. The actuating assembly 70 actuates movement of the cutting assembly 40 relative to the stump (S). The actuating assembly 70 may be, for example, operatively connected to the connector member 34 and to the cutting assembly 40 and may further be powered by hydraulic fluid in operative communication with the drive assembly 42 to provide power for delivery of pressurized hydraulic fluid such as oil. It should be appreciated that the actuating assembly 70 may also be powered mechanically, pneumatically, or electrically.

Efficient and appropriate grinding relies on proper operation and control of the stump grinder 10 and its various systems, wherein the operator must continually maintain and adjust numerous settings including power, wheel speed, feed rate, lateral movement, and the like, all in an effort to efficiently use the machine 10 without undue wear and tear, and in order to effectuate the quick removal of stumps (S). However, and regardless of operator experience, the act of the grinding wheel 60 contacting and grinding the stump (S) subjects the grinder to numerous stresses, forces, and the like, and the grinding process itself subjects the grinder 10 and grinding wheel 60 to the adverse effect of the material reduction process including, but not limited to, coming into contact with foreign objects such as dirt and rocks.

As such, the cutting wheel 60, may include the various holders 63 and teeth 62, are subjected to the numerous and varied forces which are generated via such grinding operations. Generally speaking only, these forces include the force exerted on each of the cutting teeth 62 during grinding (generally perpendicular to the cutting edge of the tooth); as well as the forces exerted on the teeth 62 and wheel 60 (generally tangential to the wheel/teeth when considering the downward grinding; and lateral when considering the lateral movement thereof). Further, the angle of attack (e.g., angle of the holder and/or teeth) of the cutting assembly will also affect not only the ability, rate, and ease at which the stump grinding operation can be carried out, but also the forces exerted on the cutting assembly. Thus, the wheel 60, holders 63, and teeth 62 must all be properly positioned relative to one another, as well as relative to the boom 58.

Figures 3A, 3B:
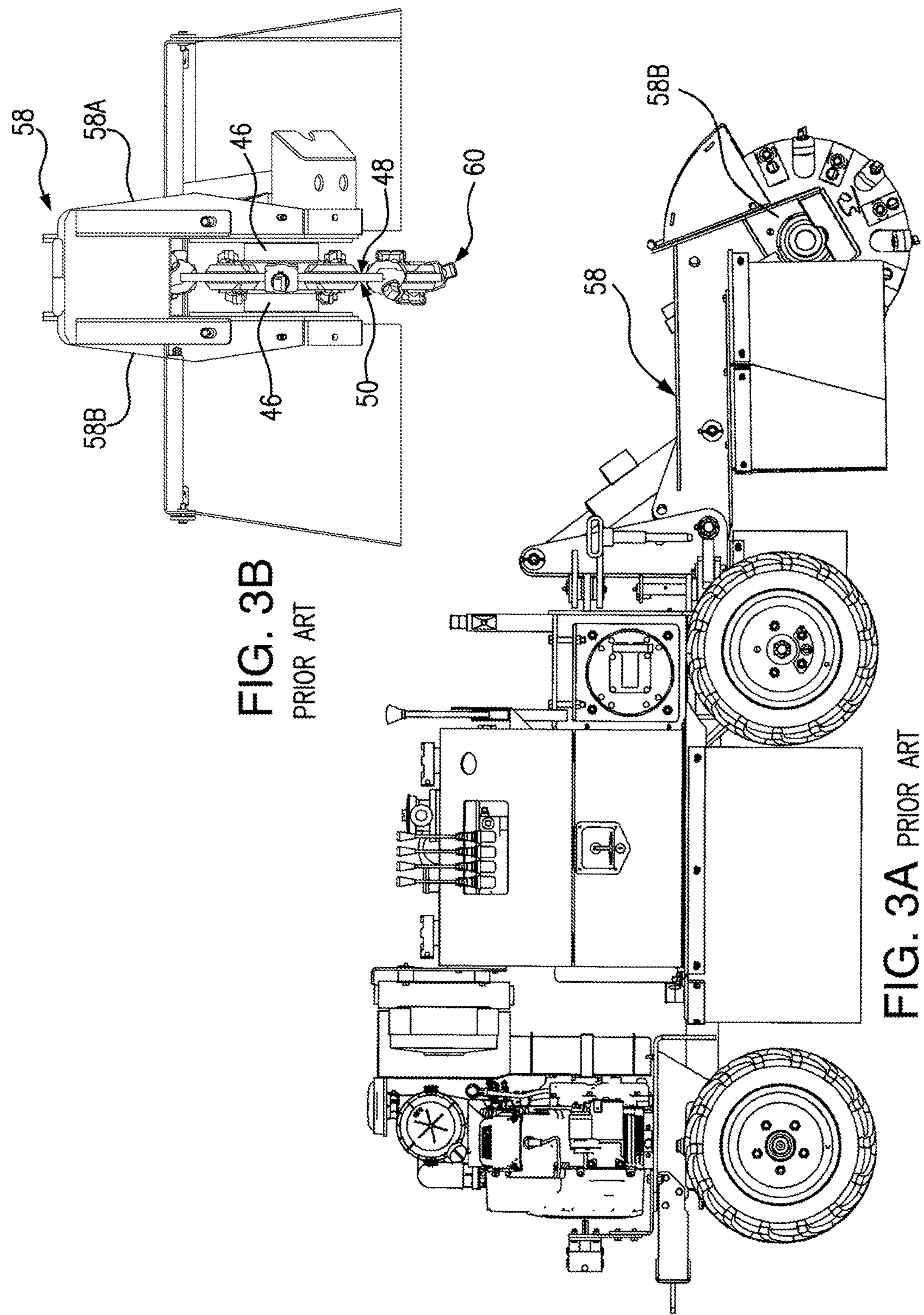
FIG. 3A is a left side view of another prior art stump grinder.
FIG. 3B is an exploded partial front view of the stump grinder of FIG. 3, illustrating bearings on both sides of the cutting wheel.

Such cutting wheels 60 may be driven via: belt/pulley systems (illustrated generally in FIG. 1A), wherein it is typical to have the grinding wheel 60 operatively mounted to a forked boom 58, comprising forks or arms 58A and 58B, via a pair of bearings 46 on each arm 58A and 58B (FIG. 3A) and powered by the pulley system; or via a direct drive mechanism (not shown), for example a hydraulic drive, which may be operatively connected to a single side 58A of boom 58, for example mounted via a bracket 59, which drives the grinding wheel 60 via single (or first) side 48. For clarity, the drive mechanism of FIGS. 1B, 2, 3 and 3A have not been illustrated but may comprise either a belt/pulley system or a direct drive system as described herein-above and as is known in the art. For example, both style systems (as well as other known systems) could be operatively connected between the engine 44 and wheel 60 via boom arm 58A, and in these particular illustrated examples, bearings 46 are utilized on each side 58A/58B of boom 58 for rotational support.

Figures 4A, 4B:
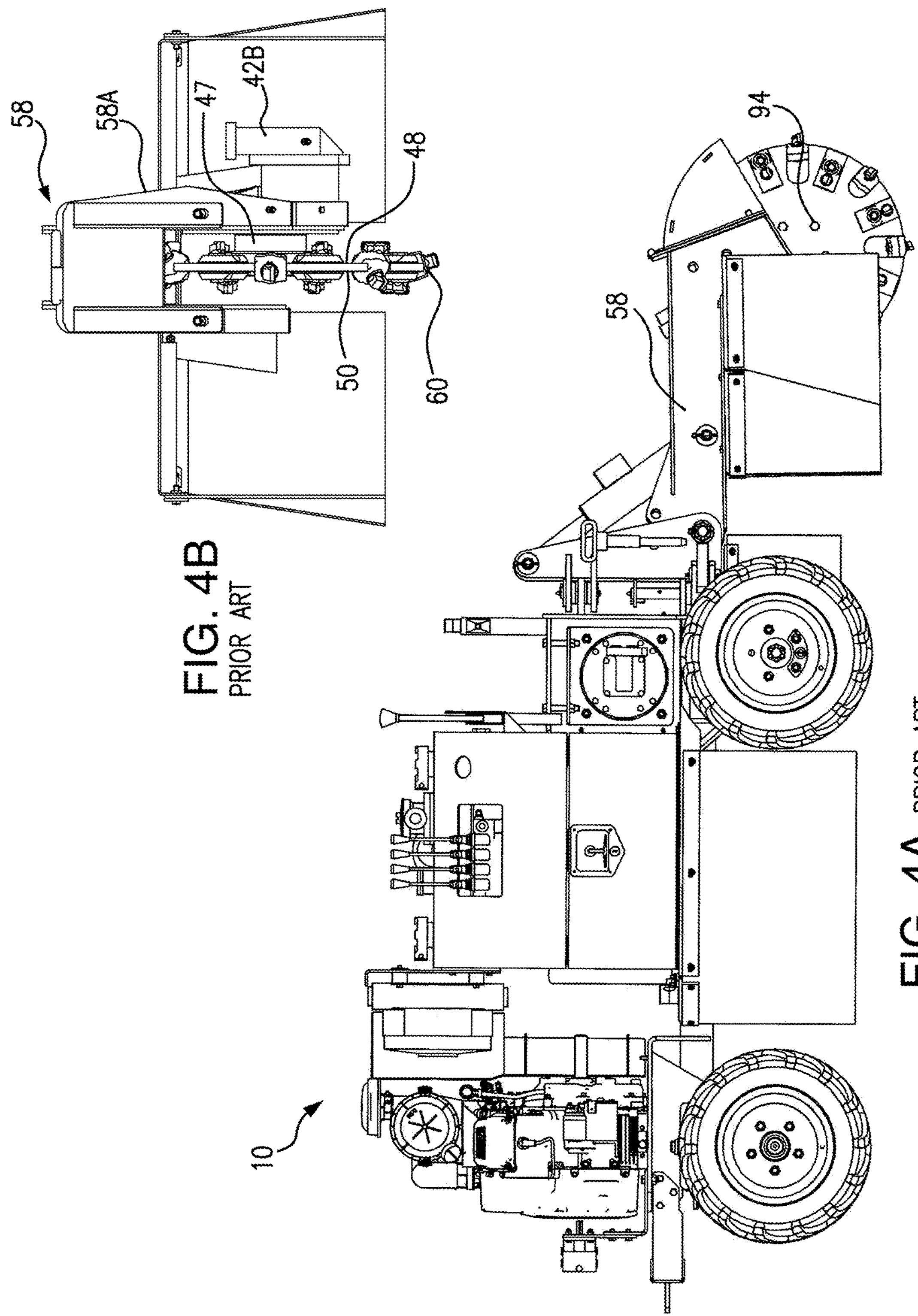
FIG. 4A is a left side view of still another prior art stump grinder including a cutting wheel supported on a single side, and illustrating the unsupported side.
FIG. 4B is an enlarged partial front view of the stump grinder of FIG. 4A.

FIGS. 4A and 4B however illustrate one advantage of a direct drive system, which is to allow operation of the cutting wheel 60 from a single side (e.g., 48), wherein the opposite side (e.g., 50) of the cutting wheel may remain unsupported and/or otherwise does not require a bearing or other rotational support.

Due primarily to the operative connection (e.g. mechanics and operation) of these direct drive systems to the cutting wheel, such direct drive systems, generally speaking, do not require bearings 46 as do the pulley driven systems and in the illustrated exemplary system, the cutting wheel 60 is operatively mounted to and rotatably suspended on the boom 58 via a direct drive system 42B, for example a hydraulic drive, as well as powered thereby. Further, the side 50 of the cutting wheel, opposite the drive side 48, may be bearing-less, unsupported, or otherwise free of any connections and support and thus, the wheel in such systems is operatively connected to the boom 58 via a single operative connection 47 to the drive 42B.

With respect to these single sided, direct drive systems 42B, and while they produce many advantages including cost and maintenance reduction, the lack of support on the free side 50, in conjunction with the high stress and forces generated during the grinding process, may lead to undesired effects which are associated with such single supported-driven systems. For example only, such undesired effects may include, and with respect to the cutting wheel 60: torsional; lateral; horizontal and vertical; angular; as well as fore and aft effects, forces, stresses and the like.

While prior art systems have attempted to prevent or otherwise mitigate such effects through the use of a bearing or other contacting rotation support on the opposite side 50, complications arise with such solutions, whereby, and as a consequence of the direct drive system operatively supporting and powering the wheel, when the bearings of such systems fail, the operator may not know of or otherwise be aware of the failing or failed bearing as the direct drive system can operate without such support. This can be problematic in such situations as the bearing can then be allowed to continue to operate and “burn out” (e.g., remain in operation during and after failure) thereby causing additional problems and damage to the machine 10, boom 58, wheel 60, axel (if provided), and drive 42B. Therefor the costs associated with the maintenance of such machines are increased, as well as the attention which is required during operation.

Accordingly, the present stump grinders, confinement, and guide systems, devices, and methods are disclosed which solve the aforementioned problems.

For the most part hereinafter we will limit our discussion of the invention as related to a stump grinder. However, the inventive embodiments disclosed herein are not meant to be so limited (unless claimed as such), and the inventive matter disclosed herein may be utilized on any grinding and chipping machine.

Figure 5:
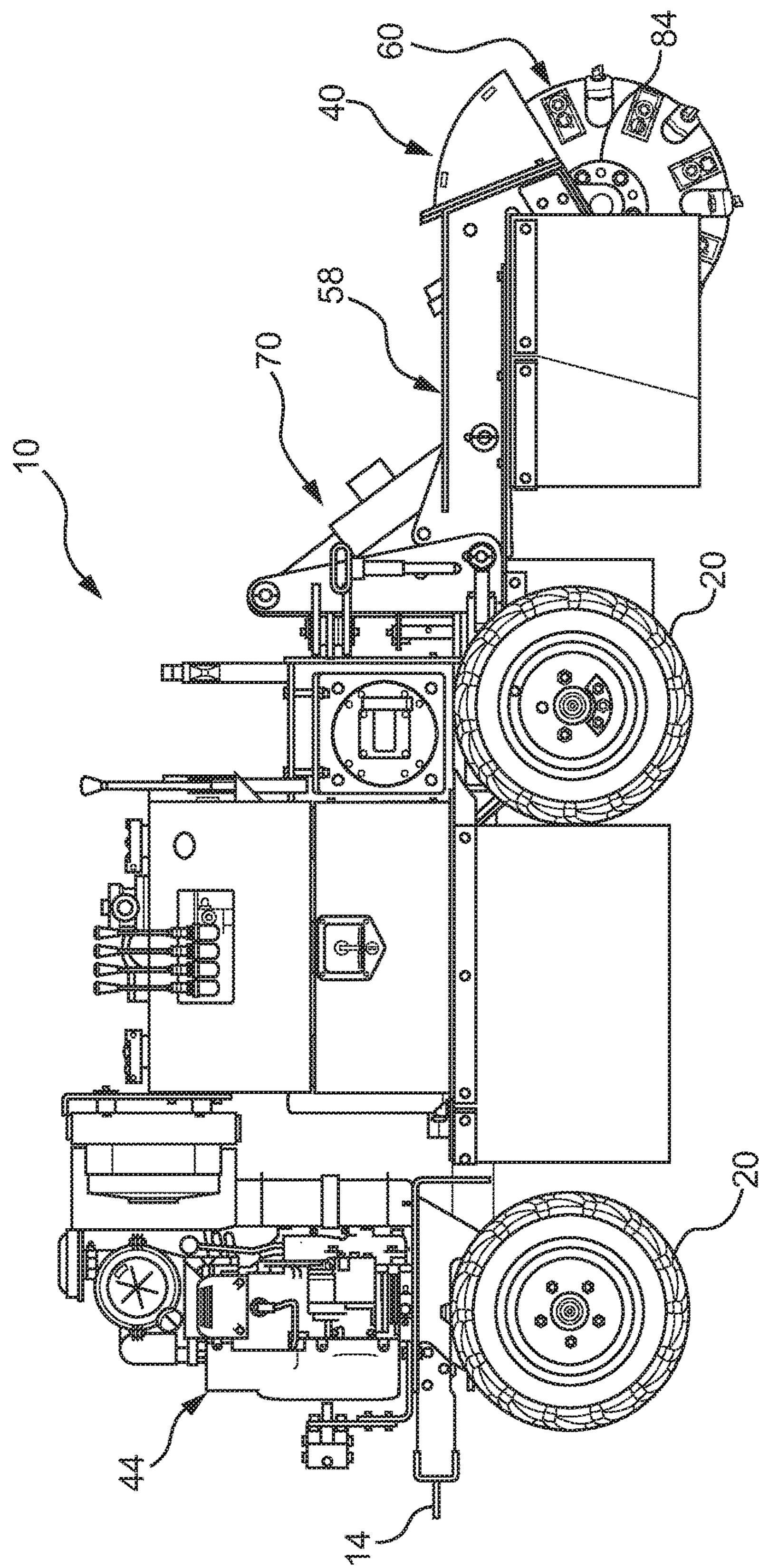
FIG. 5 is a left side view of one embodiment of the stump grinder of the present invention.

The disadvantages and drawbacks of the prior art are overcome through the stump grinding system 10 of the present invention, wherein one preferred embodiment is illustrated and shown generally by FIG. 5 and includes a frame 12 supported by a pair of wheels 18, and includes a trailer hitch 14 in order to allow the stump grinder to be transported by a vehicle. Supported on the frame 12 is a power source or engine 44, an actuation assembly and system 70, and a drive assembly (not shown) mounted to a boom 58 which operatively connects the engine 44 to the cutting wheel 60. For example, the drive assembly may by a (known) hydraulic direct drive system which is operatively mounted to an arm 58A of boom 58, and which hydraulically drives wheel 60. While other drive systems may be utilized, for exemplary clarification and for brevity only, the below-detailed embodiments will be described with respect to such a direct drive, hydraulic system.

As is generally known, operation of stump grinding system 10 typically comprises providing power to the cutting system 40 (e.g., cutting wheel 60) through power source 44, whereby drive system converts or transfers the power from the power source or engine 44 to the cutting wheel 60. Such systems and operation are described in more detail in the patents cited hereinabove and those descriptions are wholly included herein, in their entirety, by reference.

It should be understood that stump grinder 10 may comprise any suitable grinding machinery such as the trailerable grinder as seen in FIG. 5, or any other machinery used to chip, grind, cut, or otherwise reduce bulk products. Further, while the preferred embodiment incorporates a hydraulic drive, it is understood that any known drive system may be utilized. It should be further understood that this disclosure describes certain structures and operations with respect to a hydraulic system, however, other systems may also be utilized. Still further, the stump grinding system 10 is described and illustrated as being operated by an internal combustion engine, however, the system may also be powered by any other suitable method, including, but not limited to, electricity, gas, diesel, or a power take-off from an auxiliary power source, without departing from the scope of this invention.

In general, power source 44, cutting wheel 60, actuating assembly 70, and drive are known in the art. Further, it is to be understood that numerous configurations of these known devices may be used and the description herein is not meant to be limiting with respect to these systems, unless otherwise noted, and equivalent components may be used.

Figure 5A:
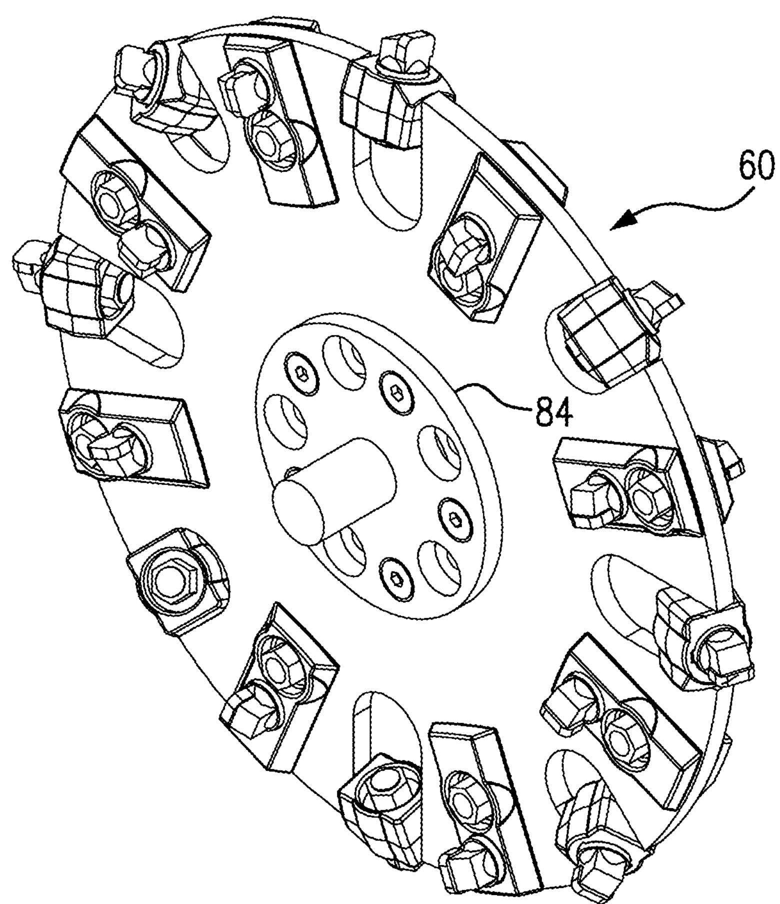
FIG. 5A is an enlarged perspective view of an embodiment of the cutting wheel of the present invention.
Figure 6:
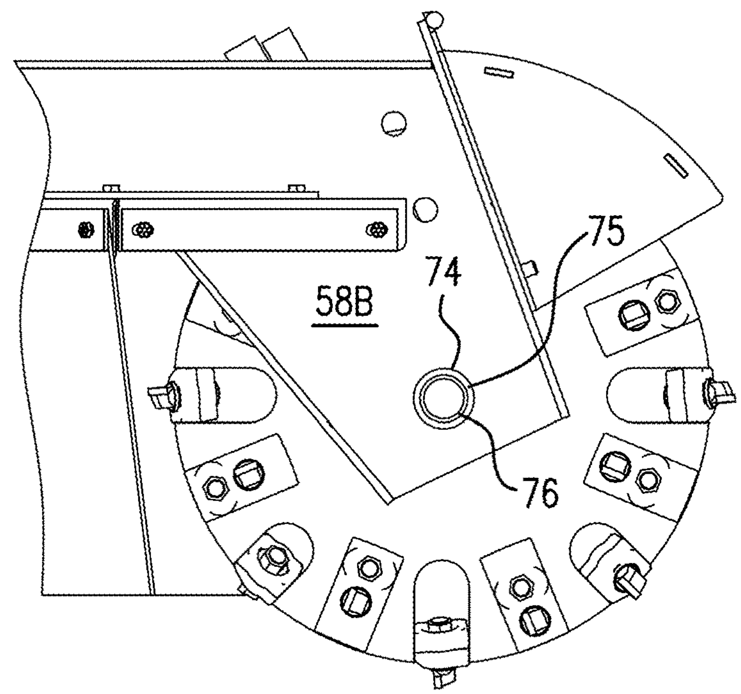
FIG. 6 is an enlarged partial left side view of an embodiment of the confinement system of the present invention.
Figure 9:
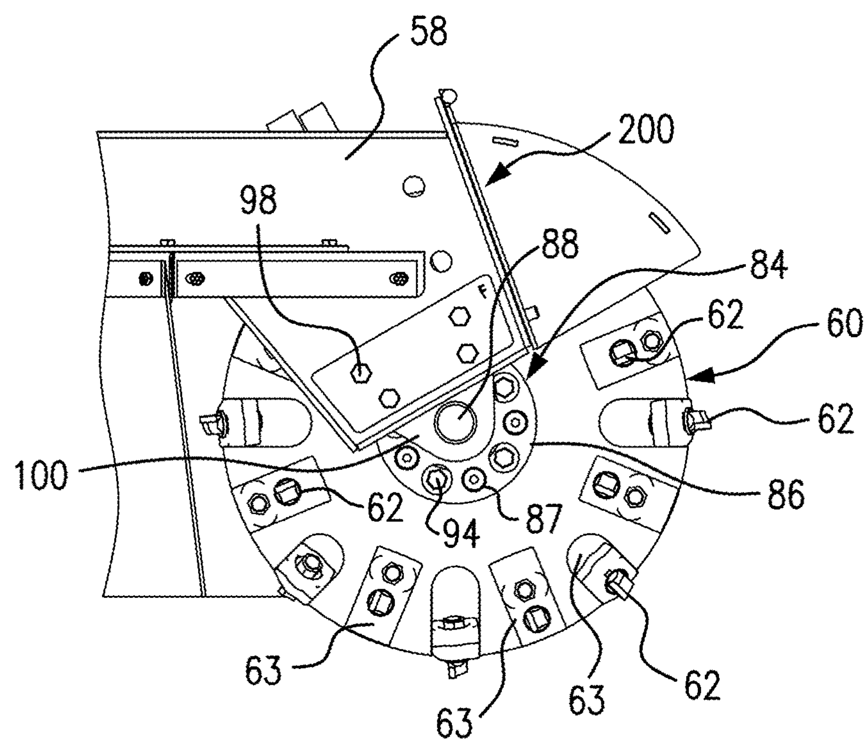
FIG. 9 is an enlarged partial left side view of another embodiment of the confinement system of the present invention.
Figure 7:
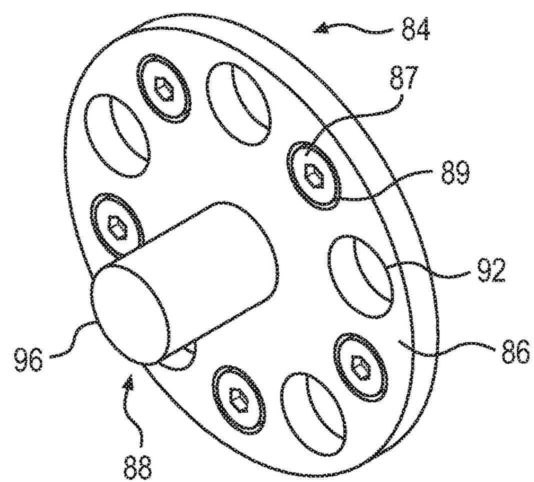
FIG. 7 is an enlarged front perspective view of an embodiment of a hub of the present invention.

Referring now to FIGS. 5, 5A, and 6 there is shown one embodiment of the invention which comprises a wheel hub or mount 84 affixed or otherwise attached to the side 50 of the cutting wheel 60. In the embodiment illustrated, the hub 84 comprises a base 86 and a spindle, stub, or axel 88 which may be, for example, centrally disposed thereon. In the illustrated embodiment, the hub 84 is attached to the side 50 of the cutting wheel 60 via a plurality of threaded fasteners 87 (FIG. 7) which pass through (third) apertures 89 and into threaded apertures (not shown) in wheel 60. Also provided are a plurality of (fourth) apertures 92 which allow the base 86 of hub 84 to be disposed or otherwise be attached flat against the side 50 of the cutting wheel 60 by allowing any protrusions disposed on the wheel to pass therethrough or reside therein, for example, bolts 94 of cutting wheel 60 as illustrated in FIG. 9. As such, for example, a retrofittable hub may be provided for pre-existing stump grinders and cutting wheels. Of course, the cutting wheel 60 and hub 84 may also be manufactured and/or otherwise sold as a single unit as depicted by FIG. 5A, as well as separately.

The spindle, stub, or axel 88 may be disposed on the base 86 in any known manner including welding, or threadingly engaged, as well as the hub 84 may be fabricated from a single piece of stock. Further, the spindle 88 and cutting wheel 60 could also be fabricated such that the spindle 88 connects directly to the cutting wheel 60 and again this could be via any known manner including welding or being fabricated therewith, as well as threadingly engaged.

In one embodiment as illustrated by FIG. 6, the boom 58 (for example, arm 58B) may comprise an opening or boom aperture 74. Opening 74, in this embodiment, is generally circular and comprises an inside diameter 75 which is larger than an outside diameter 96 of spindle 88 so as to allow for the free (e.g., non-contacting) rotation of spindle 88 therein and as described in more detail below. Additionally, a sleeve 76 or other replaceable or wear item may also be included within aperture 75. As such, the confinement system 200 may comprise the hub 84 comprising a spindle 88, and a boom 58 which comprises an opening 74 for confining the spindle 88 under specified eccentric or off-axis movement as defined by the clearance between the outside diameter 96 of the spindle 88 and the inside diameter of the aperture 75 and as discussed further below.

Figure 8:
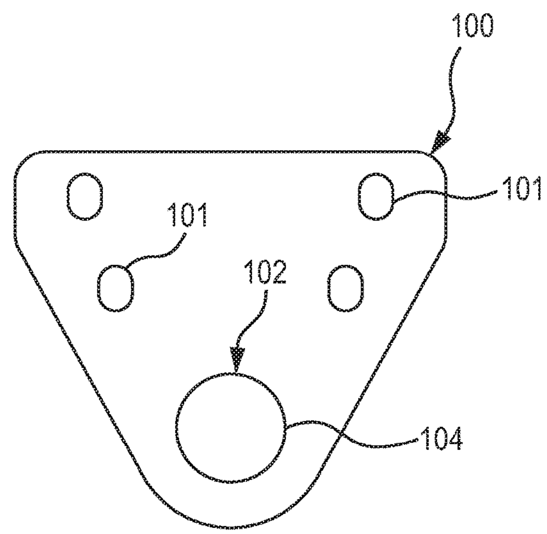
FIG. 8 is an enlarged front view of an embodiment of a guide bracket of the present invention.

Another embodiment of the confinement system 200 includes a confinement and limiting bracket, guide system, or guide member 100 as illustrated by FIGS. 5, 8 and 9 which comprises a plurality of apertures 101 and a first aperture 102. First aperture 102, in this embodiment, is generally circular and comprises an inside diameter 104 which is larger than an outside diameter 96 of spindle 88 so as to allow for the free (e.g., non-contacting) rotation of spindle 88 therein.

Figure 10:
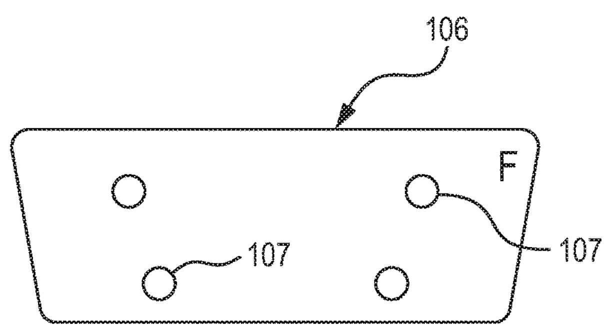
FIG. 10 is an enlarged front view of an embodiment of a support bracket of the present invention.

While system 200 may comprise only the bracket 100 attached to the boom 58, the embodiment may further include a support bracket or brace member 106 as illustrated by FIG. 10 and which comprises a plurality of apertures 107.

As best illustrated by FIG. 9, apertures 101 may be configured to be coaxially disposed with apertures 107 such that the brace member 106 may reside on one side (e.g., outside of) second arm 58B of boom 58 (opposite a first arm 58A of boom 58), and the guide 100 may reside on the opposite (for example, inside) of the arm 58B of the boom, such that threaded fasteners and bolts will mateably connect or otherwise affix the brace member 106 to the outside of second arm 58B of boom 58 (opposite the first arm 58A of boom 58), wherein fasteners will extend through corresponding (i.e., aligned) apertures (not shown) in arm 58B, and through corresponding (i.e., aligned) apertures 101 on guide 100 thereby securing and clamping the confinement assembly 200 (e.g., members 100 and 106) to arm 58B. As such, generally circular first aperture, pocket, or hole 102 comprises the internal diameter 104 which is larger than the external diameter 96 of stub, axel, or spindle 88, thereby permitting spindle 88 to rotate with wheel 60, under a no load or free spin condition, without interference with the first aperture 102. In one exemplary embodiment this clearance C (e.g., ((104−96)/2)) ranges from 0.5 inch, to more preferably 0.25 inch, to most preferably 0.125 inch. Fasteners 98 may secure system 200 via various aperture/internal thread combinations and in the embodiment illustrated, secures the system 200 by having the fastener shaft extend through apertures 107 and 101 and secured by a nut which is threadingly received on a thread of the shaft of the fastener.

Figure 11:
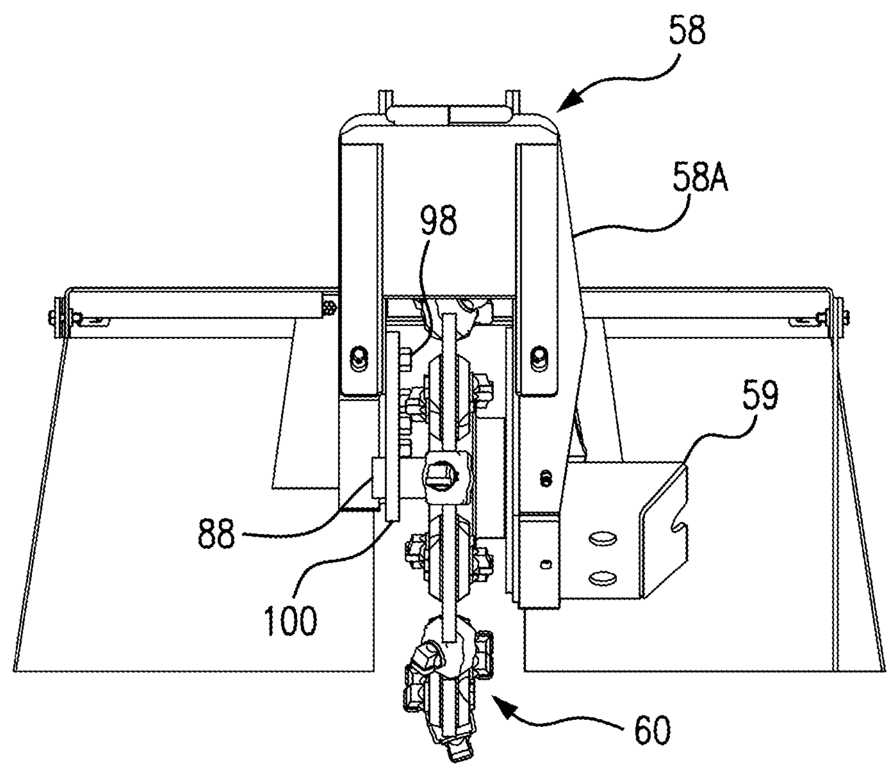
FIG. 11 is an enlarged partial front view of another embodiment of a guide system of the present invention.
Figure 15:
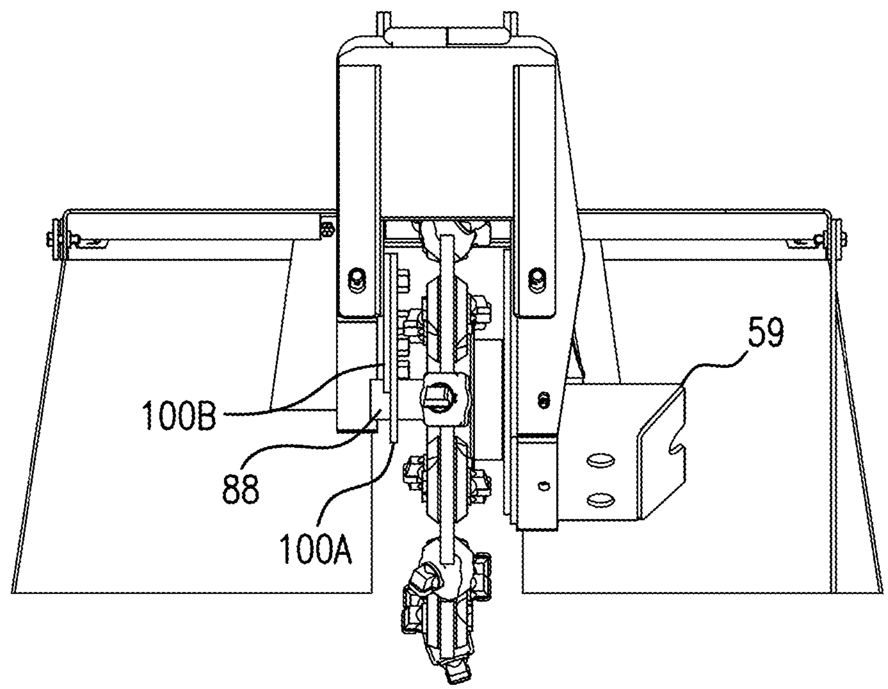
FIG. 15 is an enlarged partial front view of another embodiment of the guide system of the present invention.
Figure 12:
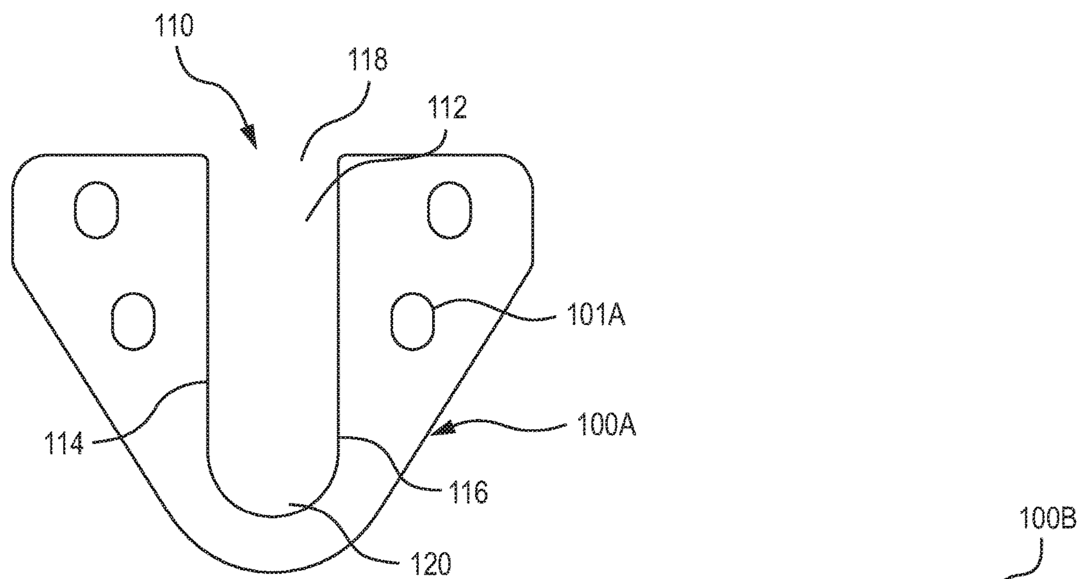
FIG. 12 is a front view of a guide bracket according to another embodiment of the present invention.
Figure 13:
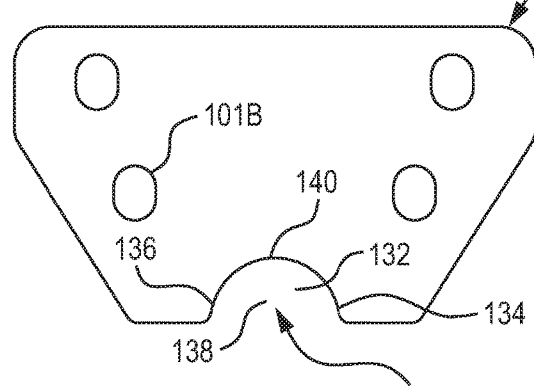
FIG. 13 is a front view of a guide bracket according to another embodiment of the present invention.
Figure 14:
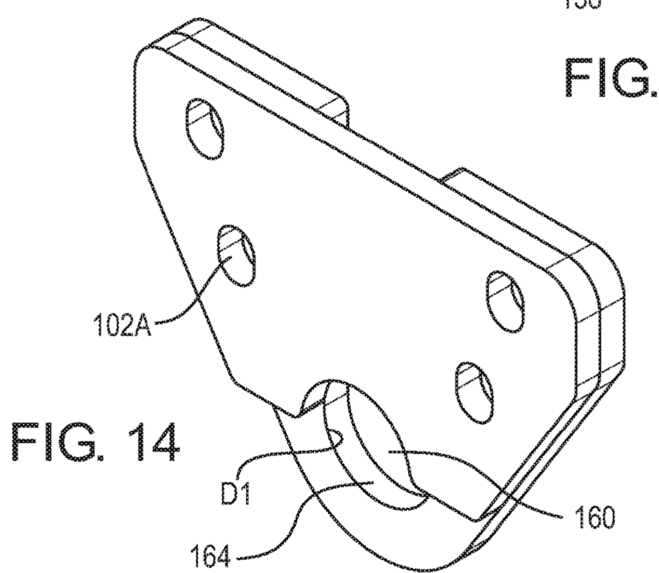
FIG. 14 is a perspective view of the brackets of FIG. 12 and FIG. 13 combined to form an aperture of the according to an embodiment of the present invention.

As such, and as best illustrated in FIG. 11, the confinement system 200 may comprise the hub 84 comprising a spindle 88, and a first confinement guide or bracket 100 which comprises a first aperture 102 for confining the spindle 88 under specified eccentric or off-axis movement as defined by the clearance therebetween. Further yet, the system may comprise a brace member or support bracket 106 for additional support as well as mounting ability.

Another embodiment of the confinement system 200 includes a guide system 100 which is provided in two parts: a first confinement and limiting bracket or guide member 100A and a second confinement and limiting bracket or guide member 100B as illustrated by FIGS. 12, 13, 14, and 15 which comprises a plurality of apertures 101A and 101B, respectively, whereby apertures 101A and 101B combine to form a second aperture 102A.

Guide member 100A comprises a slot and channel 110 which in the illustrated embodiment comprises a generally elongated U-shaped channel 112 having first and second sides 114, 116, respectively, an open end 118 and a closed end 120. In the illustrated embodiment closed end 120 comprises a generally U-shaped or C-shaped pocket.

A second confinement and limiting bracket 100B is also illustrated which comprises a plurality of apertures 101B and a slot and channel 130 which in the illustrated embodiment comprises a generally U or C-shaped channel 132 having first and second sides 134, 136, respectively, an open end 138 and a closed end 140. In the illustrated embodiment closed end 140 comprises a generally U-shaped or C-shaped pocket.

The mounting of these guides comprises affixing guide members 100A, 100B and, if used, brace member or support bracket 106, via aligned holes 101A, 101B, and 107, wherein fasteners 98 will extend through corresponding (i.e., aligned) apertures (not shown) in arm 58B, and through corresponding (i.e., aligned) apertures 101A on the second bracket and through corresponding (i.e., aligned) apertures 101B on the first bracket thereby securing and clamping the retaining assembly (e.g., members 100A, 100B, and 106) to arm 58B and thereby providing and creating a generally circular pocket, aperture, or hole 160 which comprises an internal diameter D1 which is larger than the external diameter 96 of spindle 88, thereby permitting spindle 88 to rotate with wheel 60, under a no load or free spin condition, without interference with the pocket 160. In one exemplary embodiment this clearance C (e.g., ((D1−96)/2)) ranges from 0.5 inch, to more preferably 0.25 inch, to most preferably 0.125 inch. Fasteners 98 may secure assembly via various aperture/internal thread combinations and in the embodiment illustrated, secures the retaining assembly (e.g., members 100A, 100B, and 106) by having the fastener shaft extend through apertures 107, 101B, and 101A and secured by a nut which is threadingly received on a thread of the shaft of the fastener. Also disclosed is brace member 106 which can be used to further support the system 200 as described above.

In operation then, as the wheel 60 rotates, the spindle 88 freely rotates within pocket 160 without interference. However, if such a force is exerted on the wheel 60 so as to cause sufficient torsional; lateral; horizontal and vertical; angular; as well as fore and aft effects, forces, stresses and the like, thereby causing the clearance C to be lost, the outside surface 97 of spindle 88 contacts an inside surface 164 of pocket 160.

This contact will act to limit the amount of movement, rotation, twist, offset, and the like, as well as provide temporary support for the wheel 60 during periods of high stress. Thus, the necessity of having a bearing on this side of the wheel 60 is eliminated without sacrificing the benefits that would be associated with having such a support and bearing.

As illustrated, the system 200 may include one or more of the hub 84, spindle 88, first bracket 100A, second bracket 100B, and brace member 106, and as such, the system may be retrofitted with/to existing stump grinders by providing a kit comprising, one or more of, inter alia, the hub 84, spindle 88, first bracket 100A, second bracket 100B, and brace member 106, and if not otherwise already provided, by drilling and tapping various holes/threads as illustrated. However, the system may be incorporated into the design of new stump grinders, thereby reducing the number of parts, for example by incorporating the pocket 74 directly into the arm (e.g., see generally FIG. 6); by supplying a cutting wheel 60 with the hub 84 attached; or by supplying the various kit components, depending on the desired design. Further, the spindle 88 may be attached directly to the wheel 60 and without the hub 84, for example by providing threads at a first end which are threadingly received within a threaded bore (not shown) in the cutting wheel 60.

The specific configurations and features described herein may vary according to specific requirements. In the preferred embodiment, these brackets are fabricated (e.g., cut) from steel, each in a one-piece configuration. Of course, other ridged materials and fabrication techniques may be used including materials other than steel, and utilizing stamping, folding, and welding operations. Further, in one exemplary embodiment: brackets 100A and 100B are fabricated from flat steel stock which is approximately 0.375 in thickness; brace member 106 is fabricated from flat steel stock which is approximately 0.1875 in thickness; spindle 88 is approximately 1.75 inches in length and includes an outside diameter of approximately 1.50 inches; and base 86 of hub 84 is approximately 0.50 inches in thickness.

Also disclosed is a method of limiting the movement of a grinding wheel 60 in a stump grinder 10 which includes the steps of: providing a stump grinder 10 comprising a drive 42B to operatively power the cutting wheel 60, the drive 42B connected to the cutting wheel 60 on a first side 48A of a boom 58; providing a hub 84 operatively attached to a second side 50 of the grinding wheel 60, the hub 84 including a spindle, axel, or stub 88 including a diameter of 96; providing an aperture 160 disposed coaxially adjacent the spindle, axel, or stub 88 and including a diameter D1 which is greater than the diameter 96 so as create a clearance C which allows the spindle, hub, axel, or stub 88 to freely rotate within the aperture 160 when the cutting wheel 60 is not under stress; whereby upon sufficient force, said sufficient force being determined and operatively related by and to the clearance C, deflection of the cutting wheel 60 and corresponding movement of the spindle, axel, or stub 88, the clearance C is removed and the outside surface 97 of the spindle, axel, or stub 88 will interfere with the inside surface 164 of the pocket 160, thereby limiting the amount of movement of the wheel 60, without utilizing a constant contacting device such as a bearing.

Also disclosed is another method of limiting the movement of confining a stump grinder cutting wheel 60 from a predetermined amount of eccentric movement, wherein the method comprises: providing a stump cutter 10 having a powered cutting wheel 60 attached to a boom 58, the cutting wheel 60 being supported on a single side 58A; providing a cutting wheel 60 with a spindle 88 on an unsupported side 58B; providing an aperture 74/102/160 on the stump grinder which is coaxially disposed with the spindle 88 and comprises an inside diameter 75/104/D1 which is larger than an outside diameter 96 of the spindle 88; allowing the spindle 88 to rotate without contact within the aperture when the cutting wheel is not grinding; and preventing the spindle from eccentric movement with respect to the aperture via contact between the outside diameter of the spindle and the inside diameter of the aperture.

While a linear sequence of events has been described, it should be appreciated that various modifications can be made therein and, as such, the system does not necessarily require a linear sequence of events. It is also to be understood that various modifications may be made to the system, it sequences, methods, orientations, and the like without departing from the inventive concept and that the description contained herein is merely a preferred embodiment and hence, not meant to be limiting unless stated otherwise.

The solutions offered by the invention disclosed herein have thus been attained in an economical and practical manner. To wit, novel devices, systems and methods for limiting stresses, forces, confinement and providing support to a cutting wheel, which are cost effective, easily configurable, and provide for increased productivity have been invented. While preferred embodiments and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to be appreciated that various changes, rearrangements, and modifications may be made therein, without departing from the scope of the invention as defined by the claims.

The invention claimed is:

1. A stump grinder comprising:

a boom having first and second arms with said second arm defining an opening;

a cutting wheel attached to the boom and having a driven side adjacent the first arm of the boom and an unsupported side adjacent the second arm of the boom;

a spindle attached to the unsupported side of the cutting wheel with the spindle extending toward the second arm of the boom and extending through the opening defined in the second arm of the boom;

the opening of the second arm of the boom being sized to create a clearance between the second arm of the boom and the spindle to allow the spindle to freely rotate within the opening without contacting the second arm of the boom to permit a predetermined amount of eccentric motion of the spindle as defined by the clearance between the second arm of the boom and the spindle, and to prevent eccentric motion beyond the predetermined amount of eccentric motion of the spindle via contact with the second arm of the boom.

2. The stump grinder of claim 1 wherein:

the opening is replaceable without having to remove the boom from the stump grinder.

3. The stump grinder of claim 1 wherein:

the opening is replaceable without having to remove the cutting wheel from the stump grinder.

4. The stump grinder of claim 1 further comprising a guide bracket attached to the boom with the guide bracket partially defining the opening.

5. The stump grinder of claim 4 wherein:

the guide bracket comprises a first and second guide bracket, the first guide bracket comprising a first U-shaped channel which is disposed adjacent the second guide bracket comprising a second U-shaped opening, the first and second guide brackets forming an enclosed aperture coaxial with the spindle.

6. The stump grinder of claim 1 further comprising a hub attached to the unsupported side of the cutting wheel with the hub having a base, and the spindle extending from the base toward the second arm of the boom and through the opening defined in the second arm of the boom.

7. The stump grinder of claim 6 wherein:

the hub is centrally attached to a side of the cutting wheel.

8. The stump grinder of claim 6 wherein:

the base of the hub further comprises at least one third aperture for receiving at least one fastener to attach the hub to a side of the cutting wheel.

9. The stump grinder of claim 6 wherein:

the base of the hub further comprises at least one fourth aperture to accommodate at least one protrusion extending from the cutting wheel and to allow the base of the hub to be attached flush to a side of the cutting wheel.

10. The stump grinder of claim 6 wherein:

the first aperture comprises a U-shaped channel.

11. The stump grinder of claim 6 further comprising a guide bracket attached to the second arm of the boom and the guide bracket defining a first aperture aligned with the opening defined in the second arm of the boom with the opening and the first aperture receiving the spindle and configured to allow the spindle to rotate within the opening and the first aperture without contacting the guide bracket and the second arm of the boom.

12. The stump grinder of claim 11 wherein:

the guide bracket comprises a first bracket and a second guide bracket, the second guide bracket comprising a channel, and the second guide bracket attached to the second arm of the boom such that the channel is aligned with the opening defined in the second arm of the boom and configured to allow the spindle to rotate in the aligned opening and the channel without contacting the second arm of the boom and the second guide bracket.

13. The stump grinder of claim 12 wherein:

the channel comprises a U-shape.

14. The stump grinder of claim 13 wherein:

the second guide bracket is disposed adjacent the first guide bracket.

15. The stump grinder of claim 12 further comprising a support bracket attached to the second arm of the boom attached to at least one of the first guide bracket and the second guide bracket.

16. The stump grinder of claim 12 wherein:

the first aperture and the channel form a circular hole having an inside diameter that is larger than an outside diameter of the spindle to allow the spindle to freely rotate within the hole.

17. The stump grinder of claim 11 further comprising a support bracket attached to the second arm of the boom and attached to the guide bracket with the second arm of the boom disposed between the support bracket and the guide bracket.

18. A method of confining a cutting wheel of a stump grinder from a predetermined amount of eccentric movement with the stump grinder having a boom having first and second arms with the second arm defining an opening having an inside diameter, the cutting wheel attached to the boom and having a driven side adjacent the first arm and an unsupported side adjacent the second arm, a spindle having an outside diameter and the spindle being attached to the unsupported side of the cutting wheel and extending toward the second arm of the boom and through the opening defined in the second arm of the boom, the inside diameter of the opening being larger than the outside diameter of the spindle to form a clearance between the second arm of the boom and the spindle, the method comprising:

allowing the spindle to rotate within the opening without contacting the second arm of the boom; and permitting a predetermined amount of eccentric motion of the spindle as defined by the clearance created between the second arm of the boom and the spindle.

19. The method as set forth in claim 18 further comprising the step of preventing eccentric motion beyond the predetermined amount of eccentric motion of the spindle via contact with the second arm of the boom.

* * * * *